US012094427B2

(12) United States Patent
Jeon et al.

(10) Patent No.: US 12,094,427 B2
(45) Date of Patent: Sep. 17, 2024

(54) DIMMING PROCESSING DEVICE AND TIMING CONTROLLER

(71) Applicant: SILICON WORKS CO., LTD., Daejeon (KR)

(72) Inventors: Hyun Kyu Jeon, Daejeon (KR); Ji Won Lee, Daejeon (KR); Jung Eun Baek, Daejeon (KR); Xin Cui, Daejeon (KR); Do Hoon Lee, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 18/479,683

(22) Filed: Oct. 2, 2023

(65) Prior Publication Data

US 2024/0029668 A1 Jan. 25, 2024

Related U.S. Application Data

(63) Continuation of application No. 17/235,049, filed on Apr. 20, 2021, now Pat. No. 11,810,523.

(30) Foreign Application Priority Data

Apr. 22, 2020 (KR) ........................ 10-2020-0048515

(51) Int. Cl.
*G09G 3/34* (2006.01)

(52) U.S. Cl.
CPC ....... *G09G 3/3406* (2013.01); *G09G 2310/08* (2013.01); *G09G 2320/0247* (2013.01); *G09G 2320/064* (2013.01); *G09G 2320/0646* (2013.01)

(58) Field of Classification Search
CPC ....... G09G 2310/08; G09G 2320/0247; G09G 2320/064; G09G 2320/0646; G09G 2360/16; G09G 3/3406
See application file for complete search history.

(56) References Cited

U.S. PATENT DOCUMENTS

| | | | | |
|---|---|---|---|---|
| 9,892,690 B2 | 2/2018 | Zuo | | |
| 2007/0152926 A1* | 7/2007 | Kwon | G09G 3/3426 | 345/82 |
| 2009/0028460 A1* | 1/2009 | Jung | G09G 3/3426 | 382/274 |
| 2009/0102783 A1 | 4/2009 | Hwang et al. | | |
| 2010/0079504 A1 | 4/2010 | Chen | | |
| 2010/0265405 A1* | 10/2010 | Toshima | G09G 3/3426 | 348/E5.119 |
| 2012/0256818 A1* | 10/2012 | Kuroki | G09G 3/3413 | 345/102 |
| 2019/0164506 A1 | 5/2019 | Wu et al. | | |

FOREIGN PATENT DOCUMENTS

| | | |
|---|---|---|
| KR | 10-2007-0103680 A | 10/2007 |
| KR | 10-2015-0043652 A | 4/2015 |

* cited by examiner

*Primary Examiner* — Chun-Nan Lin
(74) *Attorney, Agent, or Firm* — ROTHWELL, FIGG, ERNST & MANBECK, P.C.

(57) ABSTRACT

An embodiment enables natural and smooth change in the brightness of a backlight unit and is able to reduce flicker by changing a dimming value between frames through a mixed function including a plurality of functions having different characteristics.

20 Claims, 13 Drawing Sheets

| | OFF brightness | ON brightness | Brightness ratio (%) | DUTY(%) | RATIO(%) |
|---|---|---|---|---|---|
| SETTING1 | 77.58 | 39.09 | 50.38 | 45.75 | 110.13 |
| SETTING2 | 77.58 | 56.06 | 72.27 | 77.83 | 92.85 |

DIMMING PROCESSING DEVICE AND TIMING CONTROLLER

CROSS REFERENCE TO RELATED APPLICATION

This application is a continuation application of U.S. patent application Ser. No. 17/235,049 filed on Apr. 20, 2021, which claims priority from Korean Patent Application No. 10-2020-0048515, filed on Apr. 22, 2020, all of which are hereby incorporated by reference in their entirety for all purposes as if fully set forth herein.

BACKGROUND

1. Field of Technology

The present disclosure relates to a dimming processing technology for visually and naturally changing a dimming value of a backlight between frames.

2. Description of the Prior Art

Among various components constituting an electronic device, the component having the highest power consumption is a display device. The display device remains in the state of being turned on during the time of providing information to a user, and continues to emit light during the time for which the display device is turned on, which results in higher power consumption in the display device than in other components of the electronic device.

For this reason, manufacturers of electronic devices have continuously conducted research and development to reduce the power consumption of display devices. Typical examples thereof are techniques for switching the display device to a standby mode or turning on only a portion of a display panel.

However, since these techniques are intended to reduce power consumption of a display device by actually constraining a user environment to a certain degree, they inevitably cause some inconvenience to users.

Meanwhile, a technique capable of reducing power consumption of a display device without changing a user environment or while providing a user environment involving little change that is negligible to the user is under development, and typical examples thereof are a local dimming technology and a global dimming technology.

Local dimming is a technique for partially driving the backlight at different brightness. According to local dimming, a display panel may be divided into several regions, and a plurality of backlight units (BLUs) may emit light to the divided regions at different brightness. Here, the great difference in brightness of the backlight unit emitting light to the respective regions may cause artifacts, for example, blocking artifacts or halo artifacts. Filtering may be performed in an image processing procedure in order to remove the artifacts, but the brightness of the backlight unit may increase during the filtering. In particular, in the case where the brightness of the peripheral backlight unit is high, the brightness of the backlight unit may also increase. As the brightness of the backlight unit increases, power consumption may also increase in proportion thereto. Although the power consumption of the backlight unit is reduced compared to the state before applying local dimming, it becomes somewhat higher as the filtering is performed, so a more efficient reduction in the power consumption may fail.

In addition, if the difference in brightness of the backlight unit emitting light is great over time, that is, if there is a great difference in brightness of the backlight unit between a first time and a second time, flicker may occur. Although filtering is performed in the image processing process in order to remove the above defect, the filtering process may cause some problems.

First, an infinite impulse response (IIR) filter may be used in filtering, but the IIR filter is unable to attain the accurate target brightness of the backlight unit. In some cases, the IIR filter may determine the intermediate brightness through interpolation between the current brightness and the target brightness, thereby improving the accuracy of attaining the target brightness. Despite this method, it may be difficult for the IIR filter to attain the accurate target brightness due to a problem of floating operation in hardware.

Next, filtering using the IIR filter may make it difficult to control the time required to reach the target brightness of the backlight unit. If the IIR filter performs interpolation, it is possible to set a time for obtaining the target brightness of the backlight unit. However, there may be a temporal difference in brightness, which may result in unnatural changes such as flicker possible to be perceived by the human eye.

In this regard, the present embodiment is to provide a dimming processing technology that provides a change in the brightness of the backlight unit, which is visually and naturally perceived, while adjusting the time required to reach the target brightness of the backlight unit.

SUMMARY OF THE INVENTION

Against this background, the present embodiment is to provide a dimming processing technique for changing a dimming value between frames through a mixed function that includes a plurality of functions having different characteristics.

In another aspect, the present embodiment is to provide a dimming processing technique for rapidly changing a dimming value in the initial interval of a dimming time for which the dimming value changes and slowly changing the dimming value in the latter interval of the dimming time.

To this end, in an aspect, the present disclosure provides a dimming processing device for adjusting a dimming value for a backlight according to an embodiment comprising: a dimming value receiving circuit configured to receive a first dimming value and a second dimming value; and a dimming value adjusting circuit configured to change the dimming value according to a first function in a first interval of a dimming change time that is configured to change the dimming value from the first dimming value to the second dimming value and change the dimming value according to a second function, which is different from the first function, in a second interval of the dimming change time.

The dimming value adjusting circuit may change the dimming value from the first dimming value to the second dimming value when a frame changes from a first frame to a second frame.

A rate of change in the dimming value according to the first function in the first interval is higher than a rate of change in the dimming value according to the second function in the second interval.

The first interval may be shorter than the second interval.

The dimming value adjusting circuit may change the dimming value to a third dimming value between the first dimming value and the second dimming value according to the first function.

The dimming value adjusting circuit may change the dimming value from a third dimming value between the first dimming value and the second dimming value according to the second function.

The dimming value adjusting circuit may change the dimming value to a third dimming value between the first dimming value and the second dimming value according to the first function, and changes the dimming value from the third dimming value according to the second function.

The first function and the second function may be functions of time, and the first function may have a slope that decreases over time in the first interval.

The first interval may include at least a portion of an initial interval of the dimming change time, and the second interval may include at least a portion of a latter interval of the dimming change time.

The first function may be a nonlinear function, and the second function may be a linear function.

The first function may have a slope that changes over time, and the second function may have a constant slope over time.

The rate of change in the dimming value may vary over time in the first interval, and may be constant over time in the second interval.

A dimming processing device for adjusting a dimming value for a backlight according to another embodiment may include: a dimming value receiving circuit configured to receive a target dimming value; and a dimming value adjusting circuit configured to change a dimming value according to the target dimming value during a dimming change time in every frame, wherein if a frame changes, the dimming value adjusting circuit may be configured to change the dimming value at a first rate of change in an initial interval of the dimming change time and change the dimming value at a second rate of change, which is lower than the first rate of change, in a latter interval of the dimming change time.

The first rate of change may vary over time in the initial interval, and the second rate of change may be constant over time in the latter interval.

The dimming value receiving circuit may receive a first target dimming value for determining the brightness of the backlight in a first frame and a second target dimming value for determining the brightness of the backlight in a second frame, and the dimming value adjusting circuit may change the dimming value from the first target dimming value to a predetermined dimming value between the first target dimming value and the second target dimming value at the first rate of change during the initial interval.

The dimming value adjusting circuit may change the dimming value from the predetermined dimming value to the second target dimming value at the second rate of change during the latter interval.

Another embodiment provides a timing controller for outputting a dimming control signal for a backlight, which may include: a dimming value adjusting circuit configured to change a dimming value of the backlight according to a first function in a first interval of a dimming change time that is configured to change the dimming value from a first dimming value to a second dimming value and change the dimming value according to a second function, which is different from the first function, in a second interval of the dimming change time; and a dimming output circuit configured to apply the dimming value to the dimming control signal and output the same.

The first dimming value and the second dimming value may be generated according to a control signal received from a host.

The dimming output circuit may transmit the dimming control signal to a backlight driving device that adjusts the brightness of the backlight.

A rate of change in the dimming value in the first interval may be higher than a rate of change in the dimming value in the second interval.

As described above, according to the present embodiment, it is possible to attain the accurate target brightness of the backlight unit without flickering or shooting in the brightness of the backlight unit by adjusting the rate of changing the brightness of the backlight unit.

In addition, according to the present embodiment, it is possible to smoothly and naturally change the brightness of the backlight unit and to reduce flicker thereof by reducing the rate of changing the brightness of the backlight unit.

DETAILED DESCRIPTION OF THE EMBODIMENTS

Figure 1:
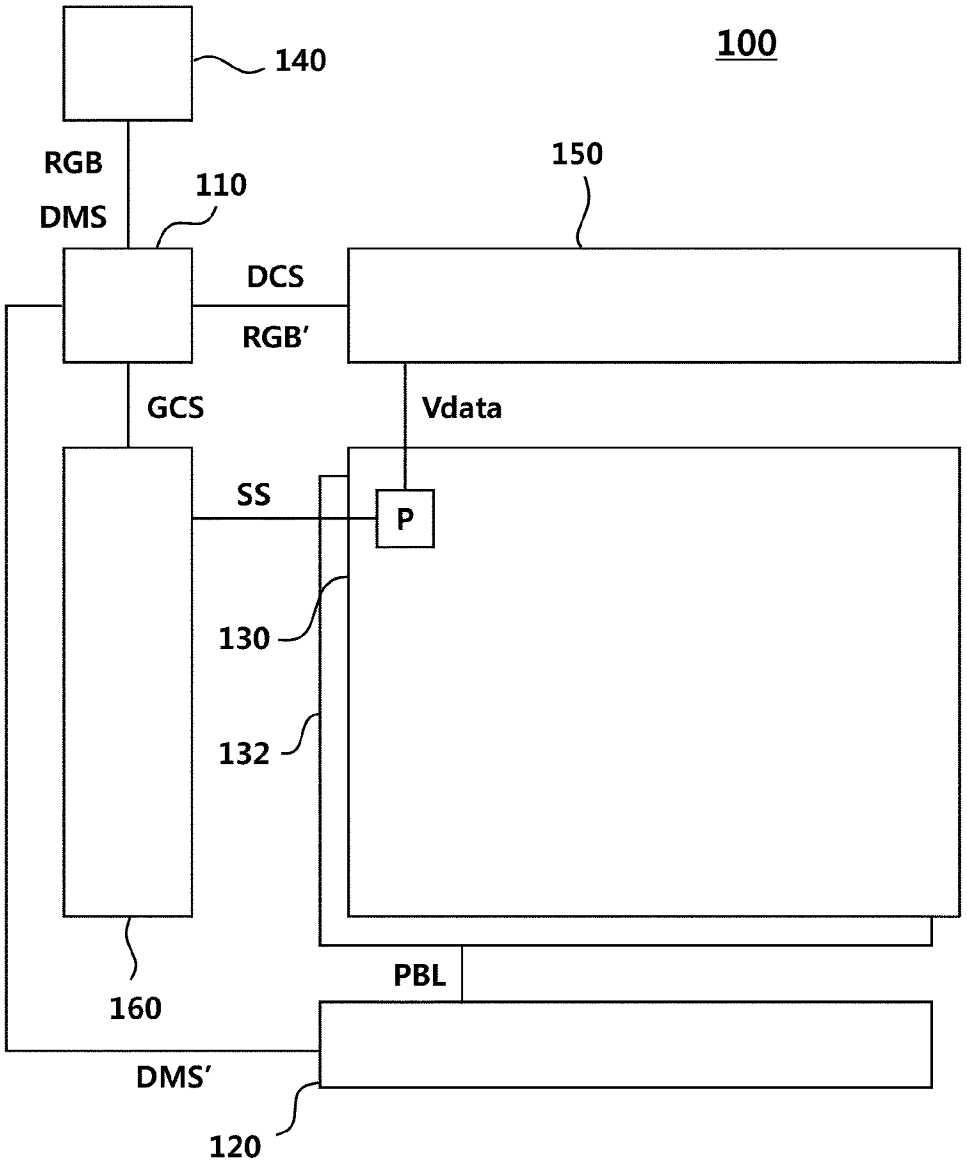
FIG. 1 is a diagram illustrating the configuration of a display device according to an embodiment.

Referring to FIG. 1, a display device 100 may include a host 140, an image data processing device 110, a data driving device 150, a gate driving device 160, a display panel 130, a backlight driving device 120, and the like.

The host 140 may recognize user manipulations, and may generate image data or a dimming control signal according to the user manipulations.

Image data may be converted into various forms in the display device 100. Hereinafter, the image data generated and transmitted by the host 140 will be referred to as "original image data" RGB in order to distinguish the same from the converted image data, and the image data generated and transmitted by the image data processing device 110 will be referred to as "converted image data" RGB'. In addition, a dimming value included in the dimming control signal may be adjusted in the display device 100. Hereinafter, the dimming control signal generated and transmitted by the host 140 will be referred to as an "unadjusted dimming control signal" DMS in order to distinguish the same from the adjusted dimming control signal, and the dimming control signal generated and transmitted by the image data processing device 110 will be referred to as an "adjusted dimming control signal" DMS'.

Referring to the flow of signals, image data is generated by the host 140, is converted by the image data processing device 110, and is then transmitted to the data driving device 150. In addition, the dimming control signal is generated by the host 140, is adjusted by the image data processing device 110, and is then transmitted to the backlight driving device 120.

The image data processing device 110 converts image data and adjusts the dimming control signal.

The image data processing device 110 may analyze original image data RGB on a plurality of pixels P arranged in the display panel 130, and may calculate a representative brightness value for the plurality of pixels P. Since the plurality of pixels P has different brightness values from each other, the image data processing device 110 calculates a representative brightness value that represents the plurality of pixels P. The representative brightness value may be, for example, an average brightness value of the plurality of pixels P. Alternatively, the representative brightness value may be, for example, the brightness value that most frequently appears in the plurality of pixels P, or may be the maximum brightness value thereof. The image data processing device 110 may calculate the representative brightness value for the plurality of pixels P using a cumulated density function (CDF) algorithm or an average pixel level (APL) algorithm.

The image data processing device 110 may calculate an adjusted dimming value for driving a backlight 132 according to the representative brightness value or the value obtained by modifying the representative brightness value according to a predetermined configuration. Here, the dimming value may be understood as a dimming brightness value. The higher the dimming value, the higher the brightness value of the backlight 132. For example, if the dimming value is 100%, the backlight 132 may be driven at the maximum brightness, and if the dimming value is 0%, the backlight 132 may be driven at the minimum brightness, or may be turned off.

The image data processing device 110 may reduce the adjusted dimming value of the backlight 132 as the representative brightness value is reduced. In other words, the image data processing device 110 may reduce the brightness of the backlight 132 as the representative brightness value is reduced.

The image data processing device 110 may convert the original image data RGB in order to compensate for a greyscale value of each pixel according to the adjusted dimming value. In order to compensate for the greyscale value, the image data processing device 110 may calculate a factor called "gain", and may convert the original image data RGB using the gain. For example, the image data processing device 110 may convert the original image data RGB such that the greyscale value of each pixel is increased as the adjusted dimming value is reduced. Here, the gain may have a characteristic of increasing the greyscale value.

The image data processing device 110 may generate an adjusted dimming control signal DMS' according to the adjusted dimming value, and may output the adjusted dimming control signal DMS' to the backlight driving device 120.

Meanwhile, a plurality of pixels P may be arranged on the display panel 130, and data lines and gate lines connected to the plurality of pixels P may be arranged thereon. The gate driving device 160 may transmit scan signals SS to the gate lines, thereby connecting the respective pixels P to the data lines, and the data driving device 150 may supply a data voltage Vdata corresponding to the image data to the data lines, thereby driving the respective pixels P.

The image data processing device 110 may transmit a gate control signal GCS to the gate driving device 160, and may transmit a data control signal DCS to the data driving device 150, thereby controlling driving timings for the respective pixels P. In this respect, the gate driving device 160 may be referred to as a "gate driver IC (GDIC)", the data driving device 150 may be referred to as a "source driver IC (SDIC)", and the image data processing device 110 may be referred to as a "timing controller (TCON)".

The backlight 132 may be disposed in the background of the display panel 130, and the backlight 132 may be driven by the backlight driving device 120.

The backlight driving device 120 may control the brightness of light sources constituting the backlight 132. The light sources may be provided by, for example, a fluorescent lamp (FL) type or a light-emitting diode (LED) type.

The backlight driving device 120 may control dimming of the backlight 132. For example, the backlight driving device 120 may control dimming of the backlight 132 using an analog dimming scheme for reducing the amount of power PBL supplied to the backlight 132 while continuously driving the backlight 132. As another example, the backlight driving device 120 may control the dimming of the backlight 132 using a pulse width modulation (PWM) scheme for adjusting the ratio of a turn-on time to a turn-off time while discontinuously driving the backlight 132. According to an embodiment, the PWM scheme may be a method of controlling the brightness of the backlight using the magnitude of voltage charged to a capacitor or the like by a PWM signal.

In the analog dimming scheme, the dimming control signal DMS or DMS' may be implemented in the form of an analog voltage or an analog current, and in the PWM scheme, the dimming control signal DMS or DMS' may be implemented in the form of a PWM signal.

Figure 2:
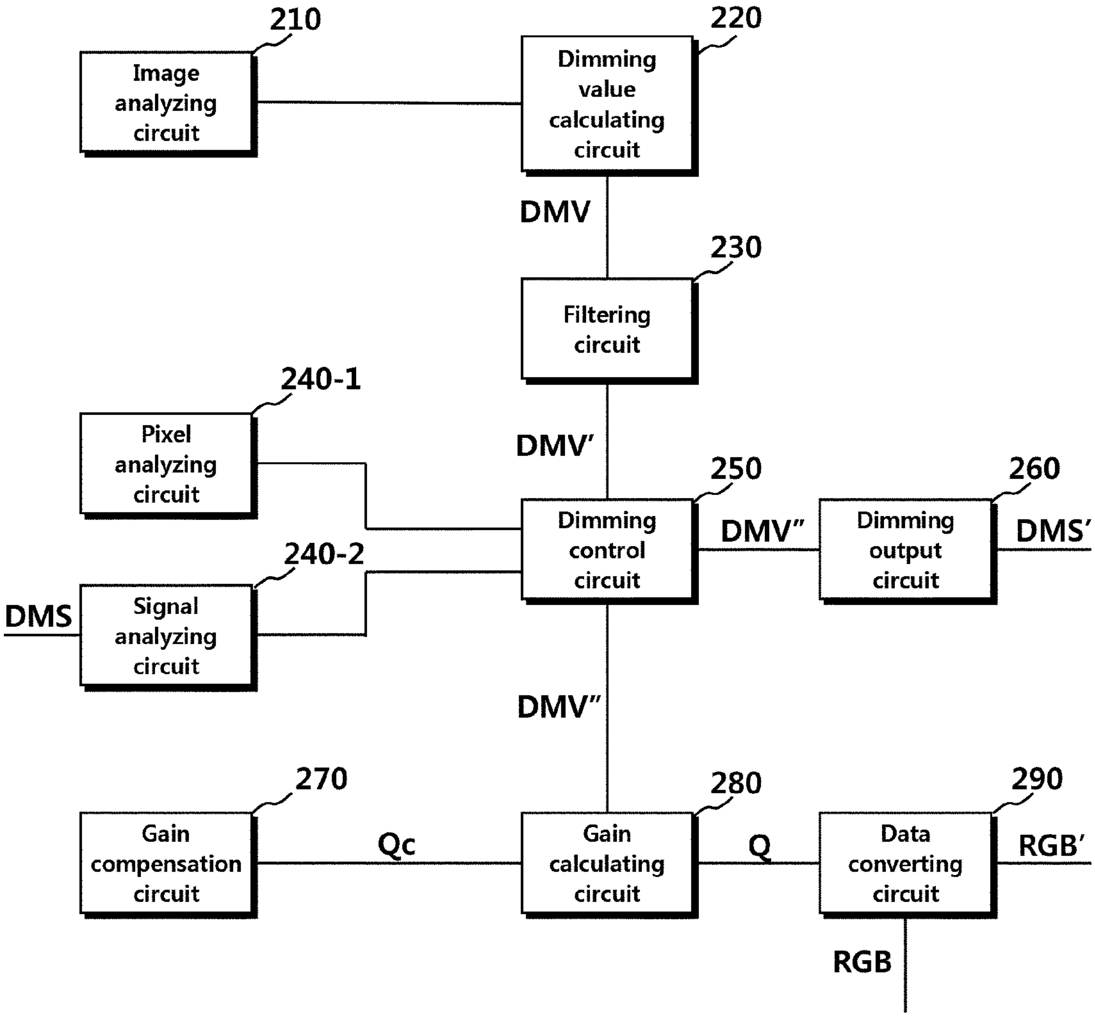
FIG. 2 is a diagram illustrating the configuration of an image data processing device according to an embodiment.

FIG. 2 is a diagram illustrating the configuration of an image data processing device according to an embodiment.

Referring to FIG. 2, the image data processing device 110 may include an image analyzing circuit 210, a dimming value calculating circuit 220, a filtering circuit 230, a pixel analyzing circuit 240-1, a signal analyzing circuit 240-2, a dimming control circuit 250, a dimming output circuit 260, a gain compensation circuit 270, a gain calculating circuit 280, and a data converting circuit 290.

The image analyzing circuit 210 may receive a video image including a plurality of regions including a plurality of pixels. The backlight 132 may adjust dimming such that the respective regions of the video image have different dimming values.

The image analyzing circuit 210 may analyze original image data RGB on the video image, and may calculate a representative brightness value for each region. The image analyzing circuit 210 may calculate a representative brightness value for original R-image data, original G-image data, and original B-image data in order to generate an appropriate dimming value for local dimming. The representative brightness value may include an average pixel level (APL). The representative brightness value may include an average value, a median value, or a value obtained through a histogram or pooling.

For example, the image analyzing circuit 210 may use, as the representative brightness value, the greatest value among the original R-image data, the original G-image data, and the original B-image data. Alternatively, the image analyzing circuit 210 may use, as the representative brightness value, the value obtained by applying an appropriate weight to the original R-image data, the original G-image data, and the original B-image data and summing the same. Alternatively, the image analyzing circuit 210 may use, as the representative brightness value, the value in which the original image data RGB is mapped to a predetermined curve.

The dimming value calculating circuit 220 may calculate a dimming value. The dimming value calculating circuit 220 may calculate an initial dimming value DMV for each region according to the representative brightness value. The dimming value calculating circuit 220 may calculate an initial dimming value DMV for the representative brightness value using a logarithmic function, an exponential function, or a user function.

The filtering circuit 230 may filter a dimming value. The filtering circuit 230 may generate a filtered dimming value DMV' by adjusting the initial dimming value DMV through filtering. The filtering circuit 230 may control a difference in the initial dimming value DMV that differs between a plurality of regions of the video image. Usually, if the initial dimming value DMV in one region is smaller than the initial dimming values DMV in neighboring regions, the filtering circuit 230 may increase the initial dimming value DMV of the one region, thereby reducing the difference therebetween. Alternatively, if the initial dimming value DMV in one region is greater than the initial dimming values DMV in neighboring regions, the filtering circuit 230 may reduce the initial dimming value DMV of the one region, thereby reducing the difference therebetween. Adjusting the difference in the initial dimming value (DMV) between a plurality of regions as described above may be understood as spatial filtering. Accordingly, the filtering circuit 230 may prevent the artifacts caused by the difference.

The filtering circuit 230 may use a weighted sum in order to adjust the dimming value. The filtering circuit 230 may receive the weighted sum as feedback, and may generate a new weighted sum, thereby performing a stable filtering operation.

The pixel analyzing circuit 240-1 may analyze brightness distribution for a plurality of pixels in each region. The pixel analyzing circuit 240-1 may determine whether or not the brightness distribution for pixels in each region is weighted toward low brightness. The pixel analyzing circuit 240-1 may transmit a result of analyzing the brightness distribution for pixels to the dimming control circuit 250. The result of analyzing the brightness distribution for pixels may be reflected in adjustment of the dimming value. For example, if the brightness distribution of pixels is weighted toward low brightness in one region, the dimming control circuit 250 may adjust the filtered dimming value DMV' to be low.

The pixel analyzing circuit 240-1 may use a histogram in order to analyze the brightness distribution for pixels. The pixel analyzing circuit 240-1 may compare the number of low-brightness pixels with the number of high-brightness pixels from a histogram result. Alternatively, the pixel analyzing circuit 240-1 may receive, as feedback, the representative brightness value calculated by the image analyzing circuit 210, and may use the representative brightness value in order to determine the brightness distribution for pixels.

The signal analyzing circuit 240-2 may analyze an input signal that is used as a dimming control signal. For example, the dimming control signal may be implemented in the form of a PWM signal, and the backlight may be driven to correspond to the ratio of a turn-on time in the PWM signal. Here, the PWM signal may correspond to an input dimming control signal DMS analyzed by the signal analyzing circuit 240-2. The signal analyzing circuit 240-2 may analyze the characteristics (e.g., a frequency, a cycle, a level, or a duty) of a PWM signal. The signal analyzing circuit 240-2 may transmit a result of analyzing the input dimming control signal DMS to the dimming control circuit 250. The result of analyzing the input dimming control signal DMS may be reflected in the adjustment of a dimming value.

The dimming control circuit 250 may finally determine a dimming value. The dimming control circuit 250 may apply the result of analyzing the brightness distribution for pixels and the result of analyzing the input dimming control signal DMS to the filtered dimming value DMV'.

If the brightness distribution for pixels is weighted toward low brightness in one region, the dimming control circuit 250 may reduce the dimming value of the one region in order to reduce the brightness of the backlight in the one region. According to this, the dimming control circuit 250 may calculate an adjusted dimming value DMV" based on the filtered dimming value DMV'. The dimming control circuit 250 may transmit the adjusted dimming value DMV" to the dimming output circuit 260.

The dimming control circuit 250 may change the dimming value. The dimming control circuit 250 may compare a dimming value with a target dimming value, and may gradually change the dimming value such that the dimming value reaches the target dimming value after a predetermined conversion time.

The dimming output circuit 260 may convert a dimming value into a dimming control signal, and may output the same to a backlight driving device. The dimming output circuit 260 may convert the adjusted dimming value DMV" into an adjusted dimming control signal DMS'. It is preferable that the input dimming control signal DMS and the adjusted dimming control signal DMS' are of the same type. To this end, the dimming output circuit 260 must control the cycle or frequency of the adjusted dimming control signal DMS' so as to match the cycle or frequency of the input dimming control signal DMS.

The gain calculating circuit 280 may calculate a gain for compensating for the original image data RGB according to the dimming value. The gain calculating circuit 280 may receive an adjusted dimming value DMV" from the dimming control circuit 250, and may calculate a gain for compensating for the original image data RGB according to the adjusted dimming value DMV". Specifically, in spite of the changed grayscale value of the original image data RGB and the filtered dimming value DMV', the gain Q may be a factor necessary in order for the pixels to produce the same brightness.

The gain compensation circuit 270 may compensate for the gain. The gain compensation circuit 270 may consider various situations in order to compensate for the gain.

In a first example, the gain compensation circuit 270 may compensate for the phenomenon in which a rate of change in a dimming value and a rate of change in the brightness of a pixel vary depending on a pixel level. Hereinafter, the pixel level may be a concept including a grayscale value or brightness of image data for one pixel. In order to compensate for the difference due to the fact that a ratio of an adjustment ratio of the brightness of a pixel relative to an adjustment ratio of the adjusted dimming value DMV" varies depending on a pixel level, the gain compensation circuit 270 may calculate a compensation gain Qc. For example, the gain compensation circuit 270 may calculate a compensation gain Qc compensating for the difference between a rate of reduction in the brightness and a rate of reduction in the adjusted dimming value DMV".

For example, in a first pixel having a first pixel level, the ratio of a rate of reduction in the brightness of a pixel to a rate of reduction in the adjusted dimming value DMV" may be greater than 1, but in a second pixel having a second pixel level, the ratio of a rate of reduction in the brightness of a pixel to a rate of reduction in the adjusted dimming value DMV" may be less than 1. Accordingly, the compensation gain Qc for the first pixel level and the compensation gain Qc for the second pixel level may be different from each other.

The gain compensation circuit 270 may use a look-up table (LUT) or an equation in order to calculate the compensation gain Qc. The look-up table or the equation may apply the actual situation in which the ratio of a rate of reduction in the brightness of a pixel to a rate of reduction in the adjusted dimming value DMV" varies. The look-up table may be configured as compensation gains Qc according to all pixel levels. The equation may be configured as compensation gains Qc reflecting factors occurring in the processes of manufacturing the panel and measuring the brightness thereof.

In a second example, the gain compensation circuit 270 may compensate for the phenomenon in which the brightness of a pixel according to the dimming value differs depending on the position of the pixel and the distance to the backlight. The gain compensation circuit 270 may obtain information on the brightness of a pixel using a Gaussian function or combining a linear polynomial function, a quadratic polynomial function, or the like according to a sampled point. The gain compensation circuit 270 may calculate a compensation gain Qc for compensating for the phenomenon in which the brightness of a pixel according to the adjusted dimming value DMV" differs depending on the position of the pixel and the distance to the backlight.

The gain calculating circuit 280 may finally determine a gain for compensating for the original image data RGB according to the adjusted dimming value DMV". The gain calculating circuit 280 may finally determine the gain Q by reflecting the compensation gain Qc obtained in the first example or the compensation gain Qc obtained in the second example.

The gain calculating circuit 280 may use an algorithm for finally determining a gain. If the original image data RGB is in a linear domain, the gain calculating circuit 280 may determine a gain using an equation of simply applying the gain. Alternatively, if the original image data RGB is in a non-linear domain, the gain calculating circuit 280 may determine a gain using an equation obtained by a combination of an equation of simply applying the gain and a gamma curve. In this process, if a gain of a high pixel level, which falls outside of an allowable range of the panel, is applied, the gain calculating circuit 280 may perform an operation of properly adjusting the gain and an operation of applying the same gain to an R-channel, a G-channel, and a B-channel, respectively, thereby preventing deterioration thereof.

The data converting circuit 290 may generate image data RGB' converted from the original image data RGB using the gain. The data converting circuit 290 may generate converted image data RGB' by applying the finally determined gain Q to the R-image data, the G-image data, and the B-image data.

Figure 3:
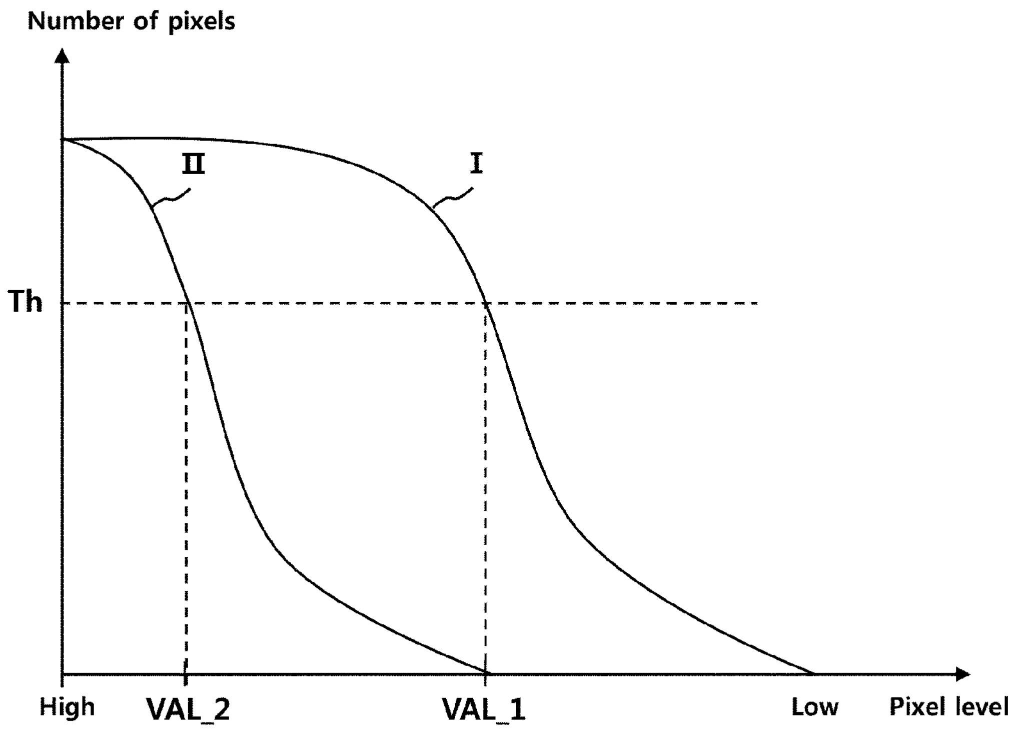
FIG. 3 is a diagram illustrating an example for explaining a reduction in a dimming value through analysis of brightness distribution of pixels according to an embodiment.

FIG. 3 is a diagram illustrating an example for explaining a reduction in a dimming value through analysis of brightness distribution of pixels according to an embodiment.

FIG. 3 illustrates an example in which the pixel analyzing circuit 240-1 determines the amount of reduction in a dimming value through analysis of brightness distribution for pixels.

The pixel analyzing circuit 240-1 may identify the brightness distribution for a plurality of regions of video image, and, if the brightness distribution of one region corresponds to low brightness, may reduce the dimming value of the region, thereby reducing power consumption of the backlight.

The pixel analyzing circuit 240-1 may perform analysis of brightness distribution for pixels in one region, thereby obtaining a curve indicating the relationship between the number of pixels and pixel levels. Here, the number of pixels may be histogramed data or NCDF (normalized cumulated density function) data.

For example, if a first region has a low brightness distribution, and if a second region has a high brightness distribution, the brightness distribution of the first region may have a first curve I, and the brightness distribution of the second region may have a second curve II. On the horizontal axis indicating the pixel level, the pixel level may change from a high level to a low level as going from the left to the right. Since the first region includes a large number of low-brightness pixels, the first curve I may have a steep rise at a low level, and may have a gentle slope at a high level. Since the second region includes a large number of high-brightness pixels, the second curve II may have a gentle slope at a low level, and may have a steep rise at a high level.

In the case where a certain number of pixels is configured as a threshold value Th on the vertical axis indicating the number of pixels, the pixel analyzing circuit 240-1 may obtain pixel levels at the points where the respective curves meet the threshold value Th. The pixel analyzing circuit 240-1 may obtain a first pixel level VAL_1 that is a pixel level at the point in which the first curve I and the threshold value Th meet, and a second pixel level VAL_2 that is a pixel level at the point in which the second curve II and the threshold value Th meet. Since the pixel level changes from a high level to a lower level as going from the left to the right on the horizontal axis indicating the pixel level, the first pixel level VAL_1 may be less than the second pixel level VAL_2.

In addition, the pixel analyzing circuit 240-1 may obtain the final size of the dimming value for reducing power consumption according to the pixel levels at the points where the threshold value Th and the respective curves meet. For example, the pixel analyzing circuit 240-1 may determine a larger amount of reduction in the dimming value as the pixel level is reduced, and may determine a smaller amount of reduction in the dimming value as the pixel level increases. Since the first pixel level VAL_1 is less than the second pixel level VAL_2, the pixel analyzing circuit 240-1 may determine a larger amount of reduction in the dimming value for the first pixel level VAL_1, and may determine a smaller amount of reduction in the dimming value for the second pixel level VAL_2.

Figure 4:
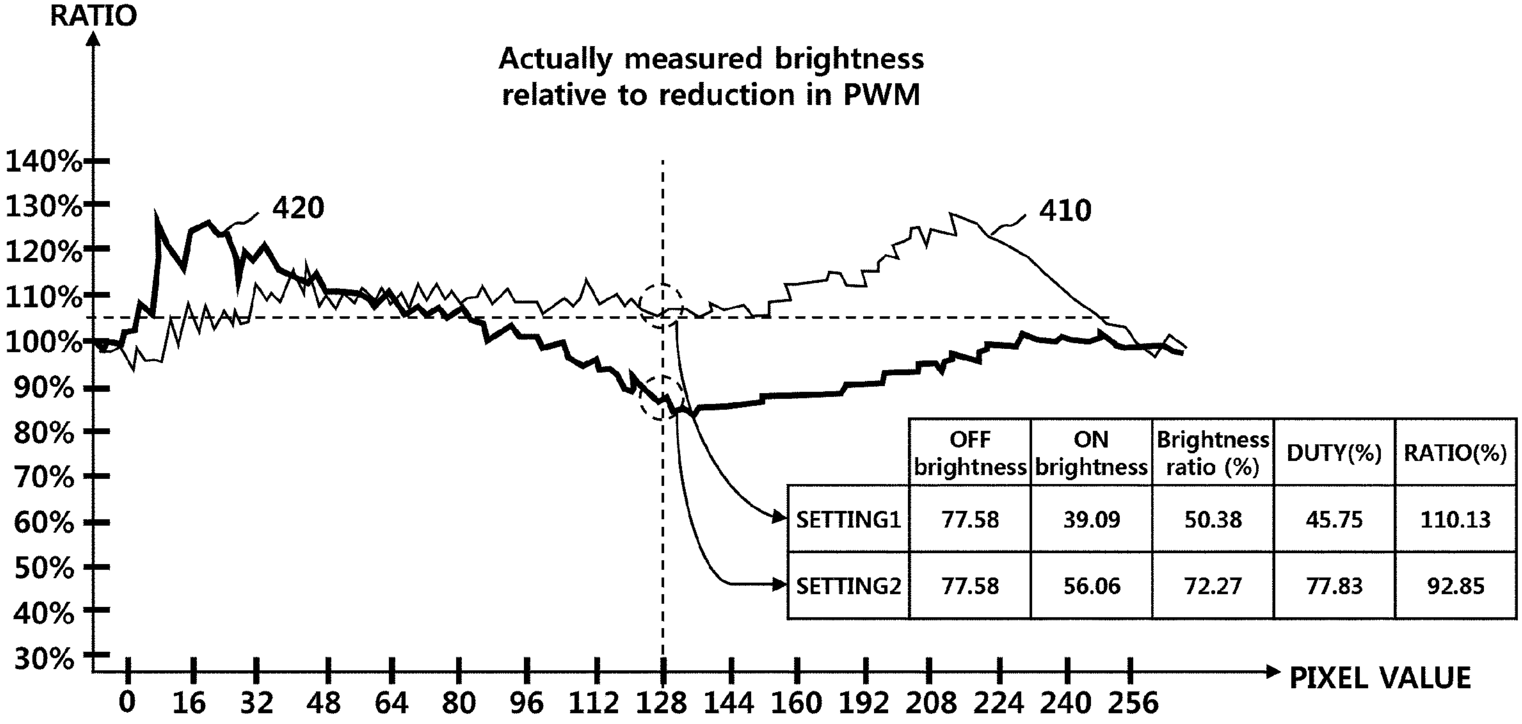
FIG. 4 is a diagram illustrating actual measurement of a reduction in brightness of a pixel in response to a reduction in a dimming value according to an embodiment.

FIG. 4 is a diagram illustrating actual measurement of a reduction in brightness of a pixel in response to a reduction in a dimming value according to an embodiment.

FIG. 4 illustrates actual measurement results showing that a rate of change in a dimming value and a rate of change in brightness of a pixel differ depending on a pixel level. A reduction in the dimming value according to pixel levels from 0 to 255 and a reduction in the brightness of a pixel according thereto may be actually measured in two setting environments. FIG. 4 illustrates a first graph 410 showing the ratio of a rate of change in the brightness of a pixel to a rate of change in a dimming value depending on pixel levels from 0 to 255 in a first setting environment (setting 1), and a second graph 420 showing the ratio of a rate of change in the brightness of a pixel to a rate of change in a dimming value depending on pixel levels from 0 to 255 in a second setting environment (setting 2).

In the case of a pixel level of 128 in the first setting environment, if the initial brightness (OFF-brightness) is 77.58, if the later brightness (ON-brightness) is 39.09, and if a rate of change in a dimming value (Duty, %) is 45.75, the rate of change in the brightness (Brightness ratio, %) may be 50.38, and the ratio (Ratio, %) of the rate of change in the brightness to the rate of change in the dimming value may be 110.13.

Meanwhile, in the case of a pixel level of 128 in the second setting environment, if the initial brightness (OFF-brightness) is 77.58, if the later brightness (ON-brightness) is 56.06, and if a rate of change in a dimming value (Duty, %) is 77.83, the rate of change in the brightness (Brightness ratio, %) may be 72.27, and the ratio (Ratio, %) of the rate of change in the brightness to the rate of change in the dimming value may be 92.85.

Referring to the first and second graphs 410 and 420, it can be understood that the ratio (Ratio, %) of the rate of change in the brightness relative to the rate of change in the dimming value differs depending on the pixel level. In addition, the ratio (Ratio, %) of the rate of change in the brightness relative to the rate of change in the dimming value according to the pixel level may differ depending on the setting environment.

Figure 5:
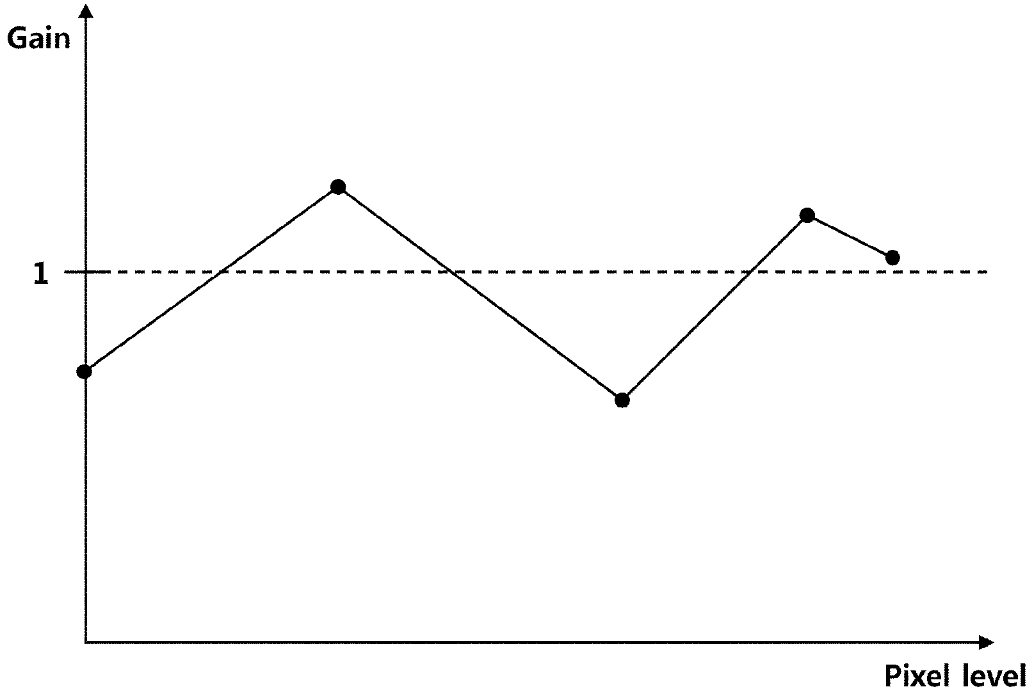
FIG. 5 is a diagram illustrating an example of calculating a compensation gain according to an embodiment.

FIG. 5 is a diagram illustrating an example of calculating a compensation gain according to an embodiment.

FIG. 5 illustrates an example in which a gain compensation circuit of an image data processing device calculates compensation gains by reflecting the fact that a ratio of a rate of change in brightness relative to a rate of change in a dimming value differs depending on the pixel level.

The gain compensation circuit may configure several points (e.g., several points among the pixel levels) by reflecting the actual characteristics as shown by the graphs in FIG. 4, and may interpolate the same, thereby calculating compensation gains. That is, the gain compensation circuit may obtain compensation gains for some pixel levels, and may interpolate the compensation gains for some pixel levels, thereby calculating compensation gains for the remaining pixel levels.

The gain compensation circuit may use a look-up table for all pixel levels in order to calculate an accurate compensation gain.

Figure 6:
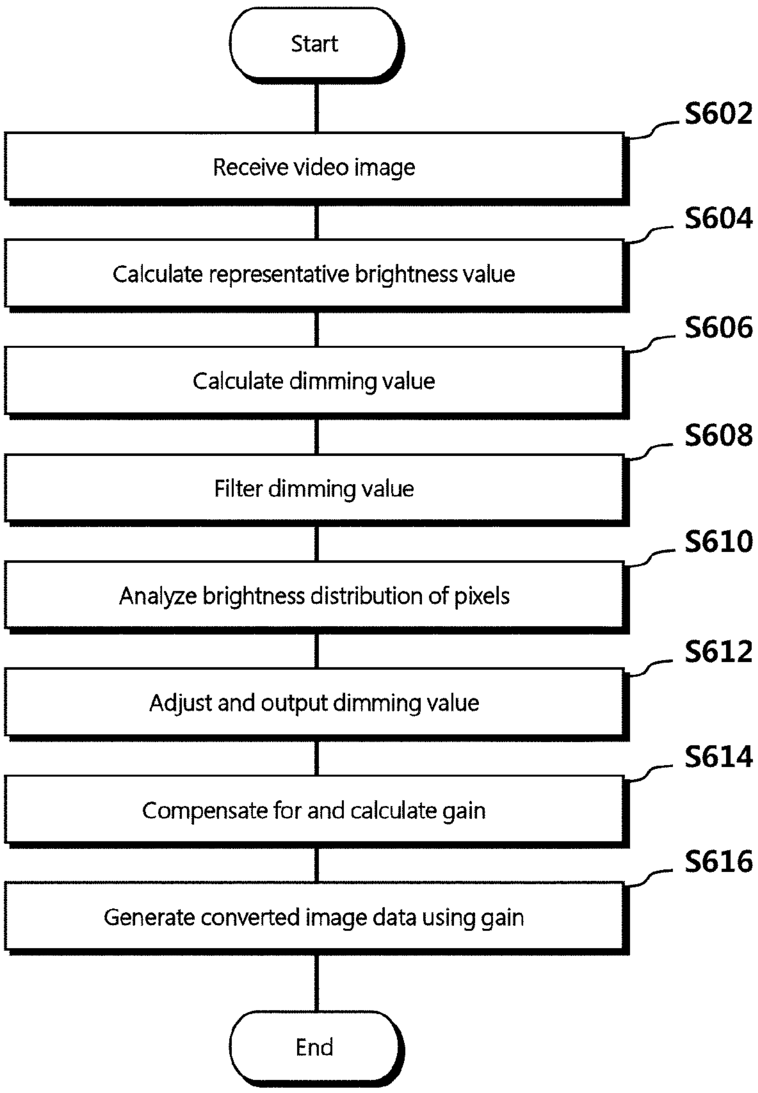
FIG. 6 is a flowchart illustrating the operation of an image data processing device according to an embodiment.

FIG. 6 is a flowchart illustrating a local dimming operation of an image data processing device according to an embodiment.

Referring to FIG. 6, the image data processing device may receive a video image including a plurality of regions including a plurality of pixels (step S602).

The image data processing device may analyze original image data on the video image, and may calculate a representative brightness value for each region (step S604).

The image data processing device may calculate a dimming value for each region according to the representative brightness value in order to adjust the brightness of the backlight (step S606).

The image data processing device may filter the dimming value (step S608). The image data processing device may increase the dimming value such that a difference of the dimming value is reduced through filtering.

The image data processing device may analyze brightness distribution of pixels for each region (step S610).

The image data processing device may adjust the dimming value, and may output the adjusted dimming value (step S612). The image data processing device may output a dimming control signal to the backlight driving device according to the adjusted dimming value. The image data processing device may reduce the dimming value for one region having a low brightness distribution in order to lower the brightness of the backlight for the one region.

The image data processing device may calculate a gain (step S614). The image data processing device may calculate a gain by reflecting the fact that the ratio of a rate of change in the brightness of a pixel to a rate of change in a dimming value differs depending on a pixel level.

The image data processing device may generate image data converted from the original image data using the calculated gain (step S616).

Figure 7:
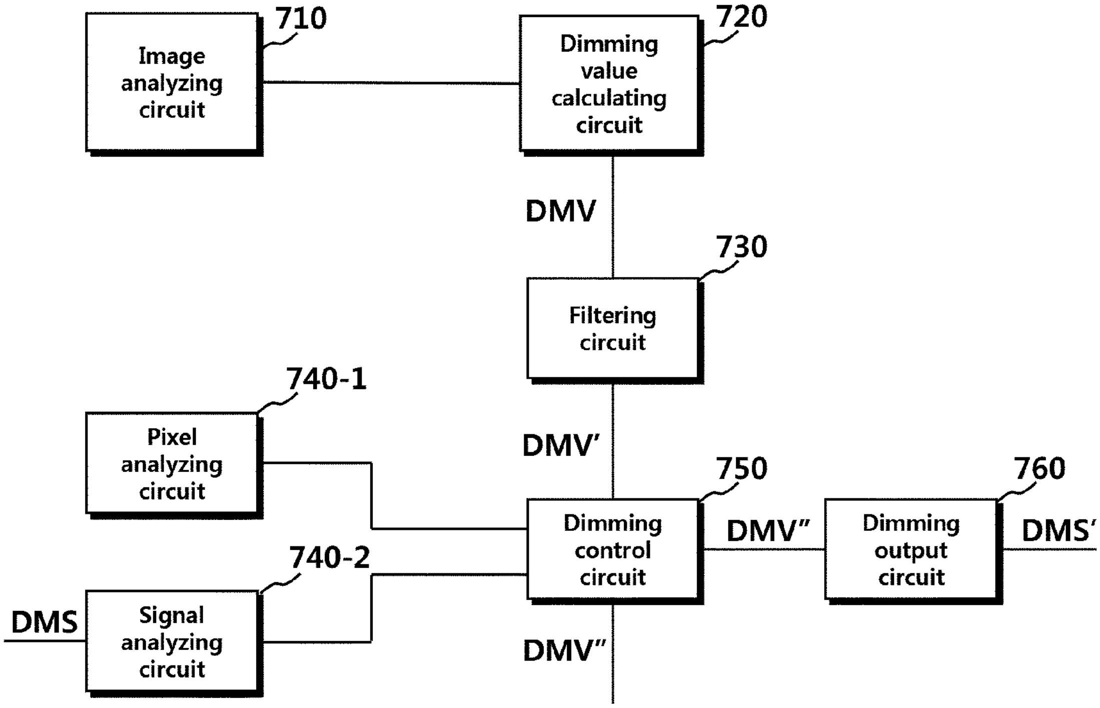
FIG. 7 is a diagram illustrating the configuration of a dimming processing device included in an image data processing device according to another embodiment.

FIG. 7 is a diagram illustrating the configuration of a dimming processing device included in an image data processing device according to another embodiment.

Referring to FIG. 7, the dimming processing device 700 may include an image analyzing circuit 710, a dimming value calculating circuit 720, a filtering circuit 730, a pixel analyzing circuit 740-1, a signal analyzing circuit 740-2, a dimming control circuit 750, and a dimming output circuit 760. The dimming processing device 700, which is a part of the image data processing device 110 in FIG. 1, may generate dimming values DMV and DMV', and may output a dimming control signal DMS' on the basis of the dimming values DMV and DMV'. Specifically, the dimming processing device 700 may include the remaining elements, excluding the elements related to conversion of image data (e.g., the gain compensation circuit 270 in FIG. 2, the gain calculating circuit 280 in FIG. 2, and the data converting circuit 290 in FIG. 2).

The image analyzing circuit 710, the dimming value calculating circuit 720, the pixel analyzing circuit 740-1, the signal analyzing circuit 740-2, the dimming control circuit 750, and the dimming output circuit 760 may perform the same functions as those shown in FIG. 2. Therefore, hereinafter, only additional functions will be described.

The filtering circuit 730 according to another embodiment may perform filtering in order to prevent flicker that occurs when there is a great difference in the dimming value between one frame and a previous frame. The filtering circuit 730 may perform temporal filtering as described above, as well as spatial filtering for changing the dimming value such that the difference between a dimming value in one region and a dimming value in a neighboring region is reduced.

The filtering circuit 730 may receive a dimming value for determining the brightness of the backlight of the display device, and may change the dimming value according to a function that determines the characteristics of change in the dimming value when a frame changes. The filtering circuit 730 may selectively use two or more functions having different characteristics of change in the dimming value depending on the interval of change in the dimming value. Therefore, the filtering circuit 730 may control the rate of change in the dimming value. Specifically, the filtering circuit 730 may rapidly change the dimming value in one interval, and may slowly change the dimming value in another interval.

For example, the filtering circuit 730 may receive an initial dimming value DMV from the dimming value calculating circuit 720. The filtering circuit 730 may perform temporal filtering on the initial dimming value DMV to generate a filtered dimming value DMV'. Here, compared to the initial dimming value DMV, the filtered dimming value DMV' may be in the state of being adjusted in the rate of change between the frames. Thus, in the case of the initial dimming value DMV, a change in the dimming value between frames may be implemented according to one function. On the other hand, in the case of the filtered dimming value DMV', a change in the dimming value between frames may be implemented according to a plurality of functions. In the filtered dimming value DMV', the dimming value may change faster in one interval than in other intervals. The filtering circuit 730 may transmit the filtered dimming value DMV' to the dimming control circuit 750.

The dimming control circuit 750 may determine a final dimming value. The dimming control circuit 750 may calculate an adjusted dimming value DMV" from the filtered dimming value DMV' by applying the analysis result of the brightness distribution of pixels and the analysis result of the input dimming control signal DMS to the filtered dimming value DMV'. The dimming control circuit 750 may transmit the adjusted dimming value DMV" to the dimming output circuit 760.

The dimming output circuit 760 may convert the dimming value into a dimming control signal, and may output the same to a backlight driving device. The dimming output circuit 760 may convert the adjusted dimming value DMV" into an adjusted dimming control signal DMS', and may output the same to the backlight driving device.

In addition, the dimming output circuit 760 may output, to the backlight driving device, a dimming control signal DMS' that is adjusted by reflecting the dimming value that changes every frame. For example, if the dimming value changes from a first dimming value of a first frame to a second dimming value of a second frame following the first frame, the second dimming value may be applied to the dimming value DMV' filtered by the filtering circuit 730. An adjusted dimming value DMV" may be generated from the filtered dimming value DMV', and the adjusted dimming value DMV" may be converted into an adjusted dimming control signal DMS'. Accordingly, the dimming output circuit 760 may output the adjusted dimming control signal DMS', reflecting the second dimming value, to the backlight driving device.

Figure 8:
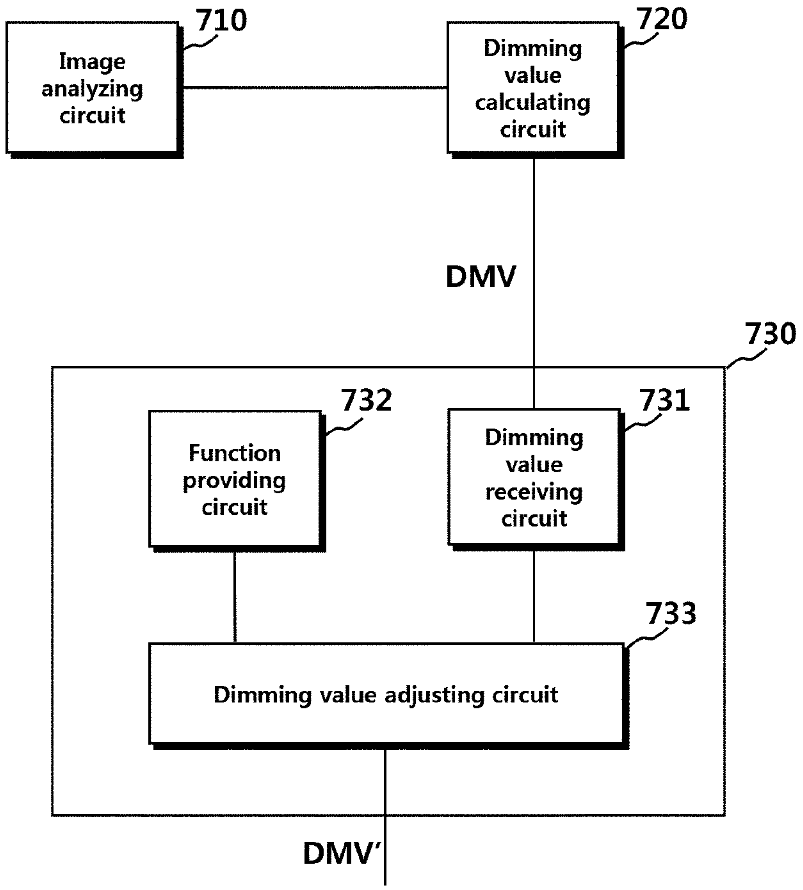
FIG. 8 is a diagram illustrating a detailed configuration of a filtering circuit included in a dimming processing device according to another embodiment.

FIG. 8 is a diagram illustrating a detailed configuration of a filtering circuit included in a dimming processing device according to another embodiment.

Referring to FIG. 8, the filtering circuit 730 may further include a dimming value receiving circuit 731, a function providing circuit 732, and a dimming value adjusting circuit 733.

The dimming value receiving circuit 731 may receive a dimming value (e.g., the initial dimming value DMV) and, may transmit the dimming value to the dimming value adjusting circuit 733. In addition, the dimming value receiving circuit 731 may receive a dimming value in every frame. For example, if the dimming value changes from a first dimming value in a first frame to a second dimming value in a second frame following the first frame, the dimming value receiving circuit 731 may receive the first dimming value and the second dimming value from the dimming value calculating circuit 720.

The function providing circuit 732 may provide a function for determining the characteristics of change in a dimming value to the dimming value adjusting circuit 733. In particular, the function providing circuit 732 may provide a plurality of functions having different characteristics of change in a dimming value. The functions may be used in modeling in which the dimming value adjusting circuit 733 changes the dimming value.

Here, the function may define a ratio or rate of change in a dimming value. When the dimming value changes according to change of frames, the dimming value may change at a ratio or rate defined by the function. A plurality of functions may define different ratios or rates depending on the inherent characteristics of change in a dimming value. The dimming value may change at a rate defined by one function during one period of time, and may change at a rate defined by another function during another period of time.

The dimming value adjusting circuit 733 may change the dimming value. The dimming value adjusting circuit 733 may receive a plurality of functions from the function providing circuit 732, and may change the dimming value according to the characteristics of the plurality of functions. Specifically, the dimming value may change from a first dimming value to a second dimming value for a dimming time, and the dimming value adjusting circuit 733 may change the dimming value according to a first function having a first characteristic in a first interval of the dimming time, and may change the dimming value according to a second function having a second characteristic, which is different from the first characteristic, in a second interval of the dimming time. It may be understood that the first dimming value is intended for the first frame and the second dimming value is intended for the second frame following the first frame.

According to this, when the frame changes, the dimming value adjusting circuit 733 may change the dimming value from the first dimming value at a first rate defined by the first function in one interval of the dimming time (e.g., the former part of the dimming time), and may change the dimming value to the second dimming value at the second rate defined by the second function in the other interval of the dimming time (e.g., the latter part of the dimming time). Here, the first rate may be higher than the second rate, but the present disclosure is not limited thereto, and in some cases, the first rate may be less than the second rate.

Figure 9:
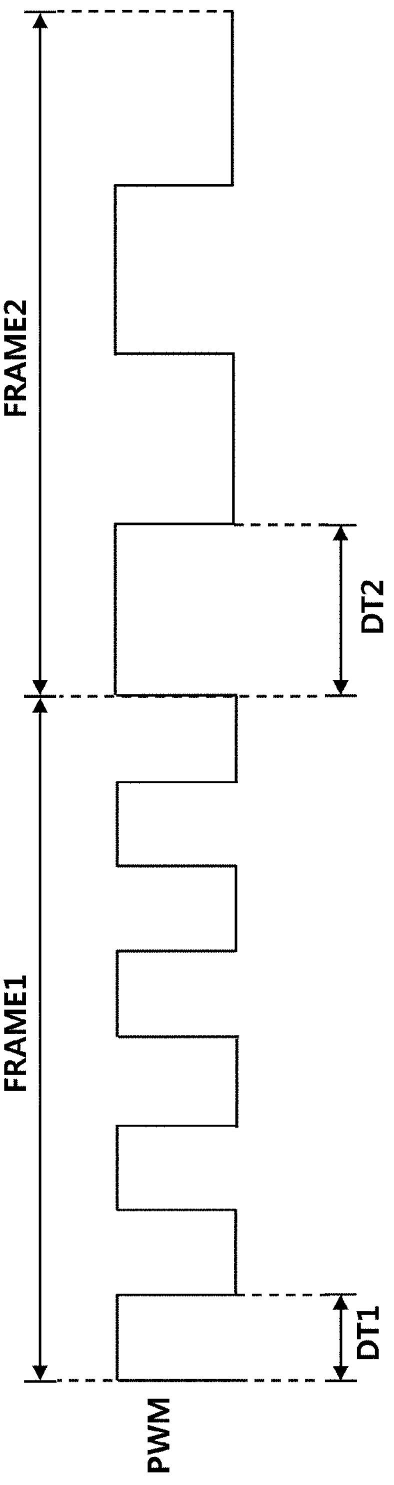
FIG. 9 is a diagram illustrating a change in duty of a PWM signal between frames according to another embodiment.

FIG. 9 is a diagram for explaining a change in duty of a PWM signal between frames according to another embodiment.

The PWM signal used as a dimming control signal may change in every frame. The PWM signal may be transmitted from the dimming processing device to the backlight driving device, thereby adjusting the brightness of the backlight. The brightness of the backlight may vary depending on the characteristics (e.g., frequency or duty) of the PWM signal.

Referring to FIG. 9, if the frequency of the PWM signal is low, or if the duty thereof is short, the brightness of the backlight may be reduced. If the frequency of the PWM signal is high, or if the duty thereof is long, the brightness of the backlight may increase.

For example, the PWM signal may have a first duty DT1 in a first frame FRAME1. The PWM signal may have a second duty DT2 in a second frame FRAME2 following the first frame FRAME1. The second duty DT2 may be longer than the first duty DT1, which may indicate that the frequency of the PWM signal in the second frame FRAME2 is lower than the frequency of the PWM signal in the first frame FRAME1. When the PWM signal has the second duty DT2, the backlight unit may be driven longer than when the PWM signal has the first duty DT1. Therefore, the backlight may be brighter in the second frame FRAME2 than in the first frame FRAME1.

When the duty of the PWM signal changes from the first duty DT1 to the second duty DT2 as shown in the drawing, the dimming processing device according to another embodiment may adjust the rate of change to be high or low. Here, the dimming processing device may use a plurality of functions capable of defining different rate characteristics in order to adjust the rate of change. Changing the duty of the PWM signal by the dimming processing device may be referred to as "modeling".

Figure 10:
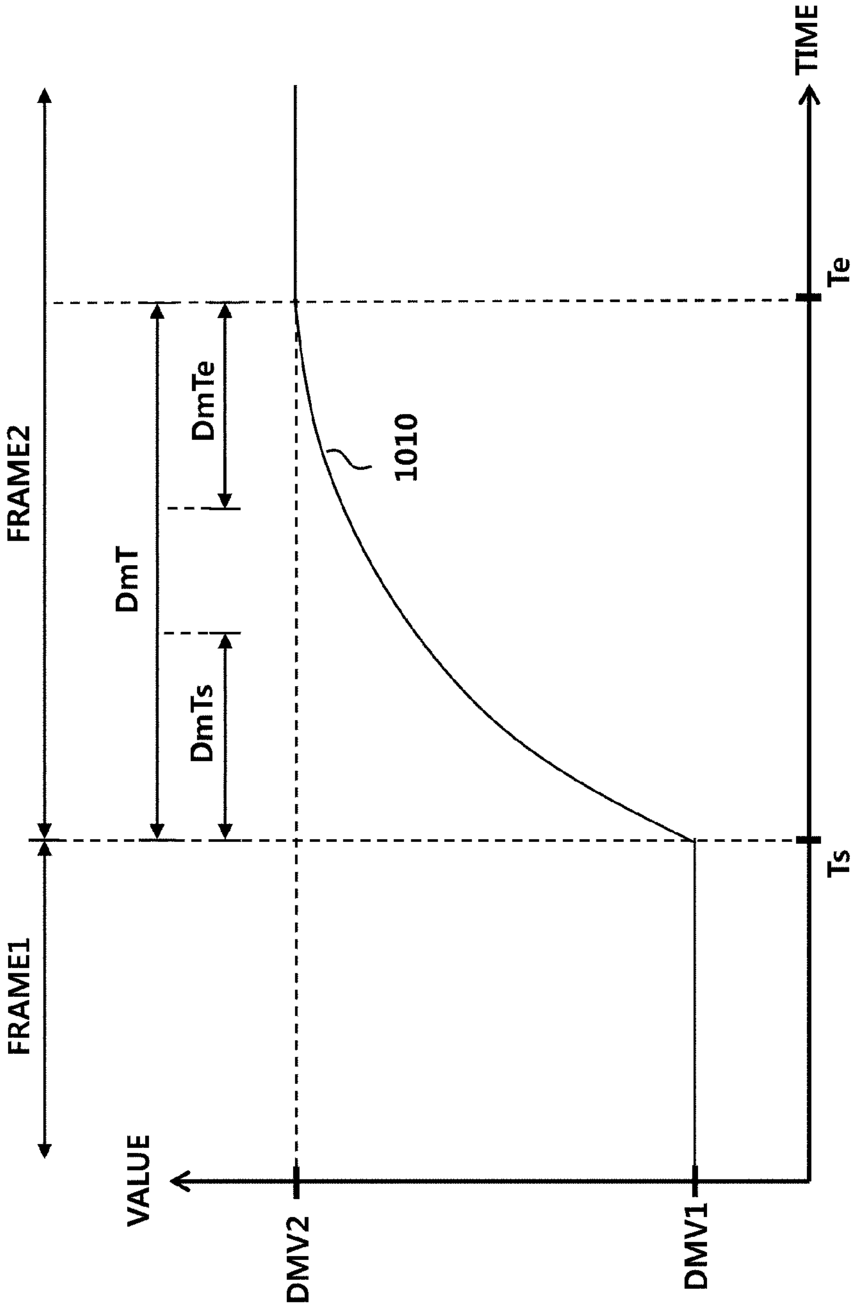
FIG. 10 is a diagram illustrating an example for explaining a change in a dimming value between frames.

FIG. 10 is a diagram illustrating an example for explaining change of a dimming value between frames.

Referring to FIG. 10, a dimming value adjusting circuit of a conventional dimming processing device may model the change of a dimming value using one function. In FIG. 10, the change of a dimming value between frames may be represented as a graph of time TIME and dimming values VALUE.

If the dimming value adjusting circuit of the dimming processing device changes a dimming value using one function, the dimming value may change from an initial dimming value to a target dimming value according to the one function.

For example, if the dimming value adjusting circuit of the dimming processing device changes a dimming value using a single function 1010, the dimming value may change from a first dimming value DMV1 to a second dimming value DMV2 along the curve indicated by the single function 1010. The dimming value may start to change from the first dimming value DMV1 at a start time Ts, and may reach the second dimming value DMV2 at an end time Te.

Here, since the single function 1010 has nonlinear characteristics, the slope may vary over time due to the nonlinear characteristics. The slope may be understood as a rate of change in the dimming value. In FIG. 10, the slope of the single function 1010 may be steep at the beginning, and may gradually become gentle later.

In addition, the period for which the dimming value changes according to change of frames may be defined as a "dimming time DmT". The dimming time DmT may include an initial interval DmTs near the start time Ts and an end interval DmTe near the end time Te. The dimming time DmT may further include an interval between the initial interval DmTs and the end interval DmTe. Since the dimming time DmT corresponds to a period during which the dimming value changes from the dimming value of the current frame to the dimming value of the next frame, the dimming time DmT may occupy one interval of the next frame. In FIG. 10, the dimming time DmT may occupy one interval of a second frame FRAME2 subsequent to a first frame FRAME1. The dimming value may completely change from the first dimming value DMV1 to the second dimming value DMV2 during the dimming time DmT, and may be maintained at the second dimming value DMV2 after the dimming time DmT.

As described above, according to the conventional dimming processing device, the dimming value may violently fluctuate because the rate of change in the dimming value is not adjusted. Thus, a sudden change in the dimming value may cause unnatural change of frames, and may result in flicker in the display for the viewer.

Figure 11:
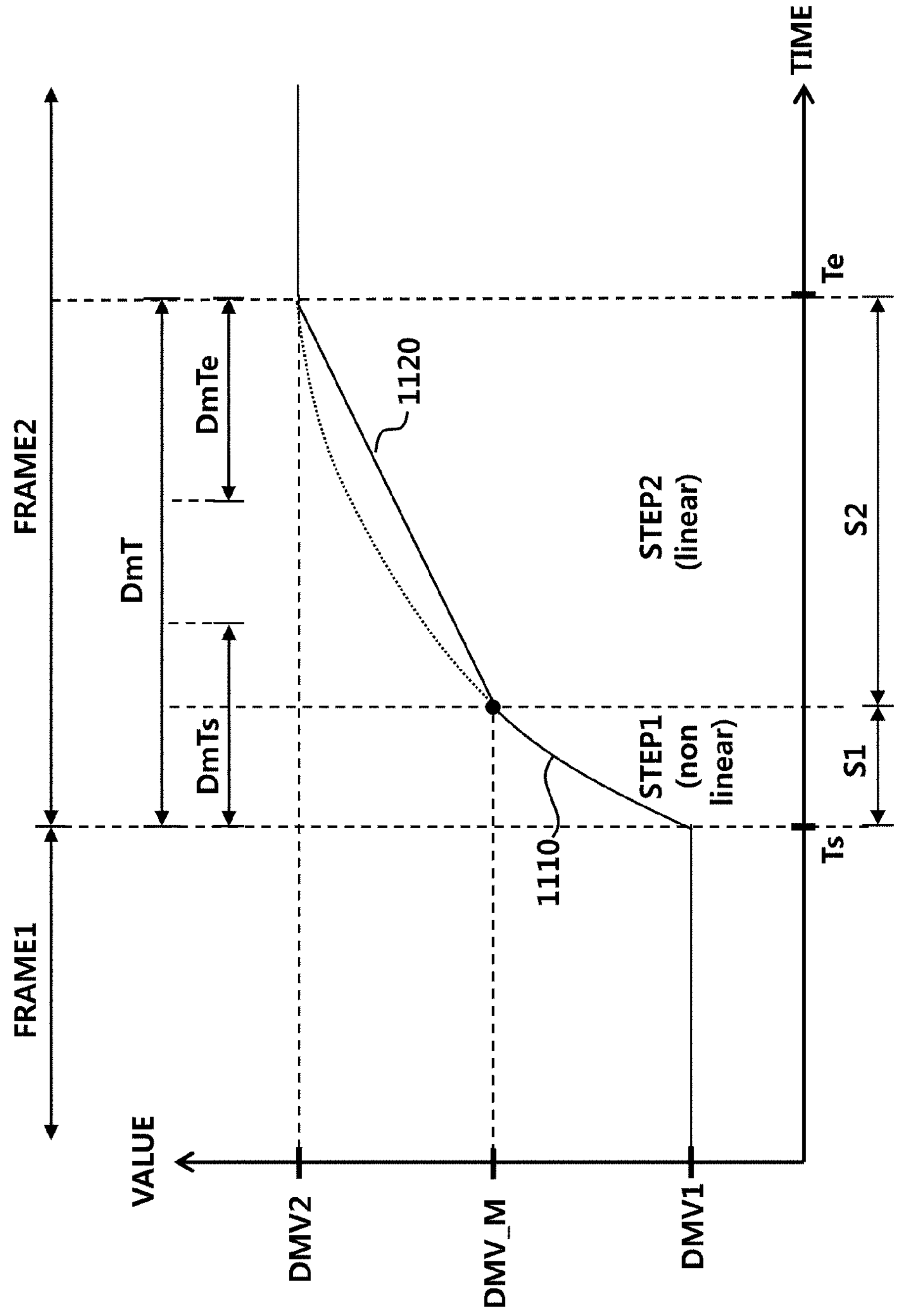
FIG. 11 is a diagram illustrating a first example for explaining a change in a dimming value between frames according to another embodiment.

FIG. 11 is a diagram illustrating a first example for explaining a change in a dimming value between frames according to another embodiment.

Referring to FIG. 11, a dimming value adjusting circuit of a dimming processing device according to another embodiment may model change of a dimming value using a plurality of functions. In FIG. 11, the change in a dimming value between frames may be expressed as a graph of time TIME and dimming values VALUE.

If the dimming value adjusting circuit of the dimming processing device changes a dimming value using a plurality of functions, the dimming value may change from an initial dimming value to a target dimming value according to the plurality of functions. Here, the dimming value may change according to one function among the plurality of functions in one interval, and may change according to another function among the plurality of functions in another interval after the one interval.

For example, the dimming value may be maintained at a first dimming value DMV1 in a first frame FRAME1. When the frame changes from the first frame FRAME1 to a second frame FRAME2, the dimming value may start to change along a first function 1110 at a start time Ts at which the second frame FRAME2 starts. The dimming value may change from the first dimming value DMV1 to an intermediate dimming value DMV_M. The intermediate dimming value DMV_M may be understood as a dimming value between a starting dimming value and a target dimming value. Thereafter, the dimming value adjusting circuit of the dimming processing device may change the dimming value according to the second function 1120. Here, the dimming value may change according to the first function 1110 during a first interval S1 of the dimming time DmT, and the first interval S1 may include a portion or the whole of the initial interval DmTs in the dimming time DmT. In FIG. 11, as a first step, the dimming value may change from the first dimming value DMV1 to the intermediate dimming value DMV_M according to the first function 1110, which is a nonlinear function, during the first interval S1 {STEP1 (nonlinear) in FIG. 11}. The first step STEP1 or the first interval S1 may correspond to a section in which the dimming value changes from the first dimming value DMV1 to the intermediate dimming value DMV_M.

The first function 1110 may be a nonlinear function or a linear function, but it may be desirable that the first function 1110 is a nonlinear function in the first step, that is, in the first interval S1 in which the dimming value starts to change. A 2's polynomial function may correspond to a nonlinear function, and a 1's polynomial function may correspond to a linear function. Since the nonlinear function has a slope that changes over time and the linear function has a constant slope over time, the rate of change in a dimming value according to the nonlinear function may increase abruptly, and the rate of change in a dimming value according to the linear function may be constant. Therefore, in general, the rate of change in a dimming value according to the nonlinear function may be higher than the rate of change in a dimming value according to the linear function. If the change in a dimming value follows a nonlinear function in the end interval DmTe of the dimming time DmT, the dimming value may change abruptly, thereby causing flicker in the display for the viewer. In addition, this makes it difficult for the dimming value adjusting circuit to accurately adjust the dimming value that changes abruptly. Therefore, the change in a dimming value needs to follow a nonlinear function in the beginning, that is, in the initial interval DmTs of the dimming time DmT.

In the second step STEP2 or the second interval S2, the dimming value may change from the intermediate dimming value DMV_M to the second dimming value DMV2. The dimming value adjusting circuit of the dimming processing device may change the dimming value according to the second function 1120. Here, the dimming value may change according to the second function 1120 during the second interval S2 of the dimming time DmT, and the second interval S2 may include a portion or the whole of the end interval DmTe of the dimming time DmT. In FIG. 11, as a second step, the dimming value may change from the intermediate dimming value DMV_M to the second dimming value DMV2 according to the second function 1120, which is a linear function, during the second interval S2 {STEP2 (linear) in FIG. 11}. The second step STEP2 or the second interval S2 may correspond to a section in which the dimming value changes from the intermediate dimming value DMV_M to the second dimming value DMV2.

In addition, the first interval S1 may be longer or shorter than the second interval S2. The lengths of the first and second intervals S1 and S2 may differ depending on the type of function used by the dimming value adjusting circuit, and in general, the interval in which a nonlinear function is used may be shorter. This is due to the fact that when the dimming value changes according to a nonlinear function, the rate of change is high and thus the dimming value is able to quickly reach the target dimming value (e.g., the intermediate dimming value DMV_M). The dimming value may reach a finally targeted dimming value according to another function (e.g., a linear function) after the target dimming value. As shown in FIG. 11, the dimming value may change according to the first function 1110 in the first interval S1, and may change according to the second function 1120 in the second interval S2. In this case, the dimming value changes abruptly in the beginning and then changes gently later, thereby reducing the occurrence of flicker caused by a sudden change in the dimming value.

As described above, according to the dimming processing device of another embodiment, the rate of change in a dimming value may be adjusted to prevent the dimming value from abruptly changing. Therefore, gentle and flexible change in the dimming value may bring about natural change of frames, and may prevent flicker in the display for the viewer.

Figure 12:
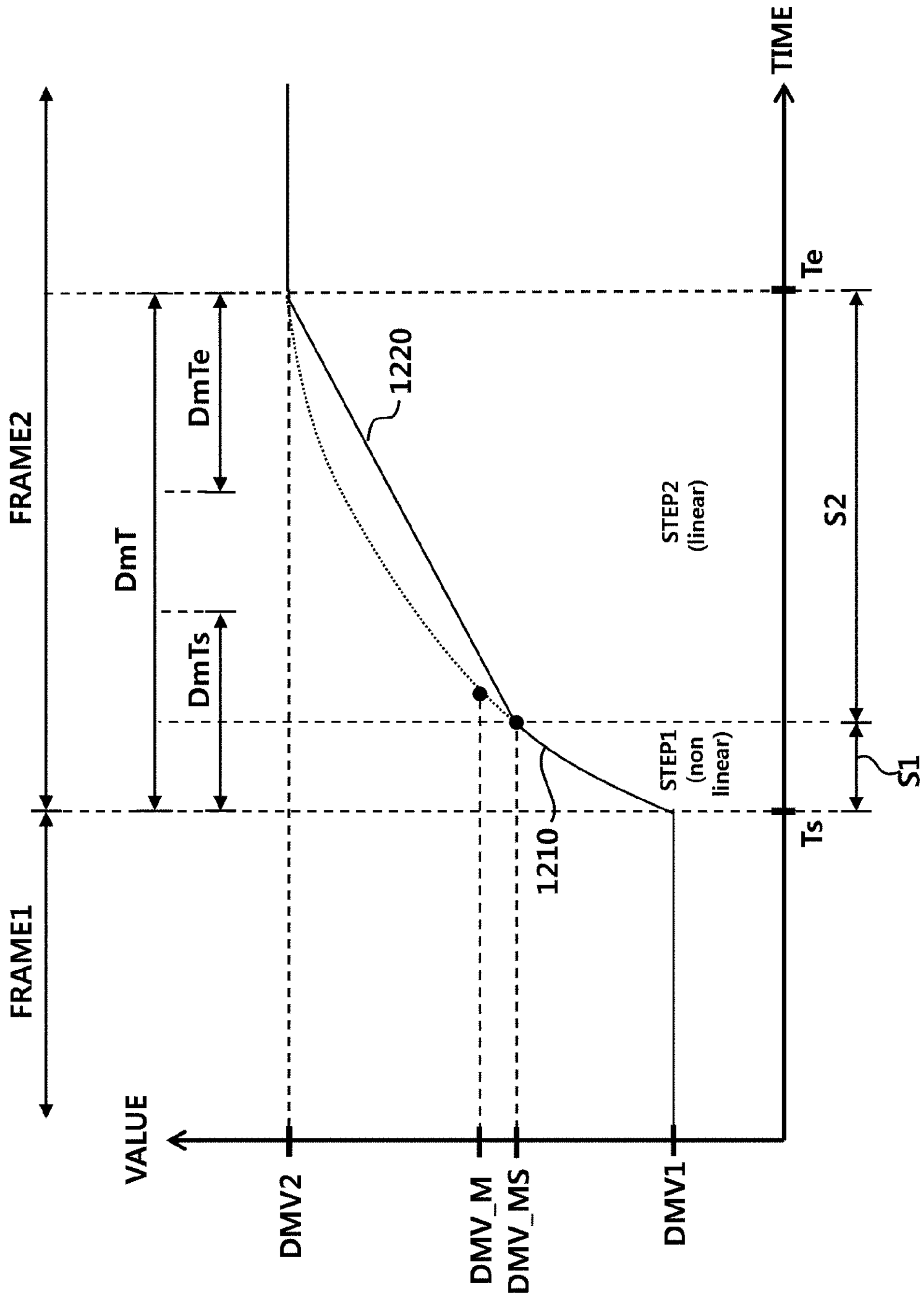
FIG. 12 is a diagram illustrating a second example for explaining a change in a dimming value between frames according to another embodiment.

FIG. 12 is a diagram illustrating a second example for explaining a change in a dimming value between frames according to another embodiment.

Referring to FIG. 12, a dimming value adjusting circuit of a dimming processing device according to another embodiment may adjust the time of changing from one function to another function while modeling changing of a dimming value using a plurality of functions.

Firstly, the dimming value adjusting circuit of the dimming processing device may change the dimming value to a predetermined dimming value according to one function in one interval. Secondly, the dimming value adjusting circuit may change the dimming value to a final target dimming value according to another function in another interval. When the dimming value reaches a predetermined dimming value, the dimming value adjusting circuit may change the function for changing the dimming value to a function having different characteristics.

In general, the predetermined dimming value may be an intermediate dimming value DMV_M (see FIG. 11). However, the present disclosure is not limited thereto, and the predetermined dimming value may be smaller than the intermediate dimming value DMV_M.

For example, the dimming value adjusting circuit may change the dimming value from a first dimming value DMV1 at a start time Ts to a dimming value DMV_MS, which is smaller than the intermediate dimming value DMV_M, during a first interval S1. In FIG. 12, as a first step, the dimming value may change from the first dimming value DMV1 to the dimming value DMV_MS smaller than the intermediate dimming value DMV_M according to a first function 1210, which is a nonlinear function, during the first interval S1 {STEP1 (nonlinear) in FIG. 12}. The first step STEP1 or the first interval S1 may correspond to a section in which the dimming value changes from the first dimming value DMV1 to the dimming value DMV_MS smaller than the intermediate dimming value DMV_M.

In a second step STEP2 or a second interval S2, the dimming value may change from the dimming value DMV_MS, which is smaller than the intermediate dimming value DMV_M, to a second dimming value DMV2. The dimming value adjusting circuit of the dimming processing device may change the dimming value according to a second function 1220. In FIG. 12, as a second step, the dimming value may change from the dimming value DMV_MS, which is smaller than the intermediate dimming value DMV_M, to the second dimming value DMV2, which is a target dimming value, according to the second function 1220, which is a linear function, during the second interval S2 {STEP2 (linear) in FIG. 12}. The second step STEP2 or the second interval S2 may correspond to a section in which the dimming value changes from the dimming value DMV_MS, which is smaller than the intermediate dimming value DMV_M, to the second dimming value DMV2.

Figure 13:
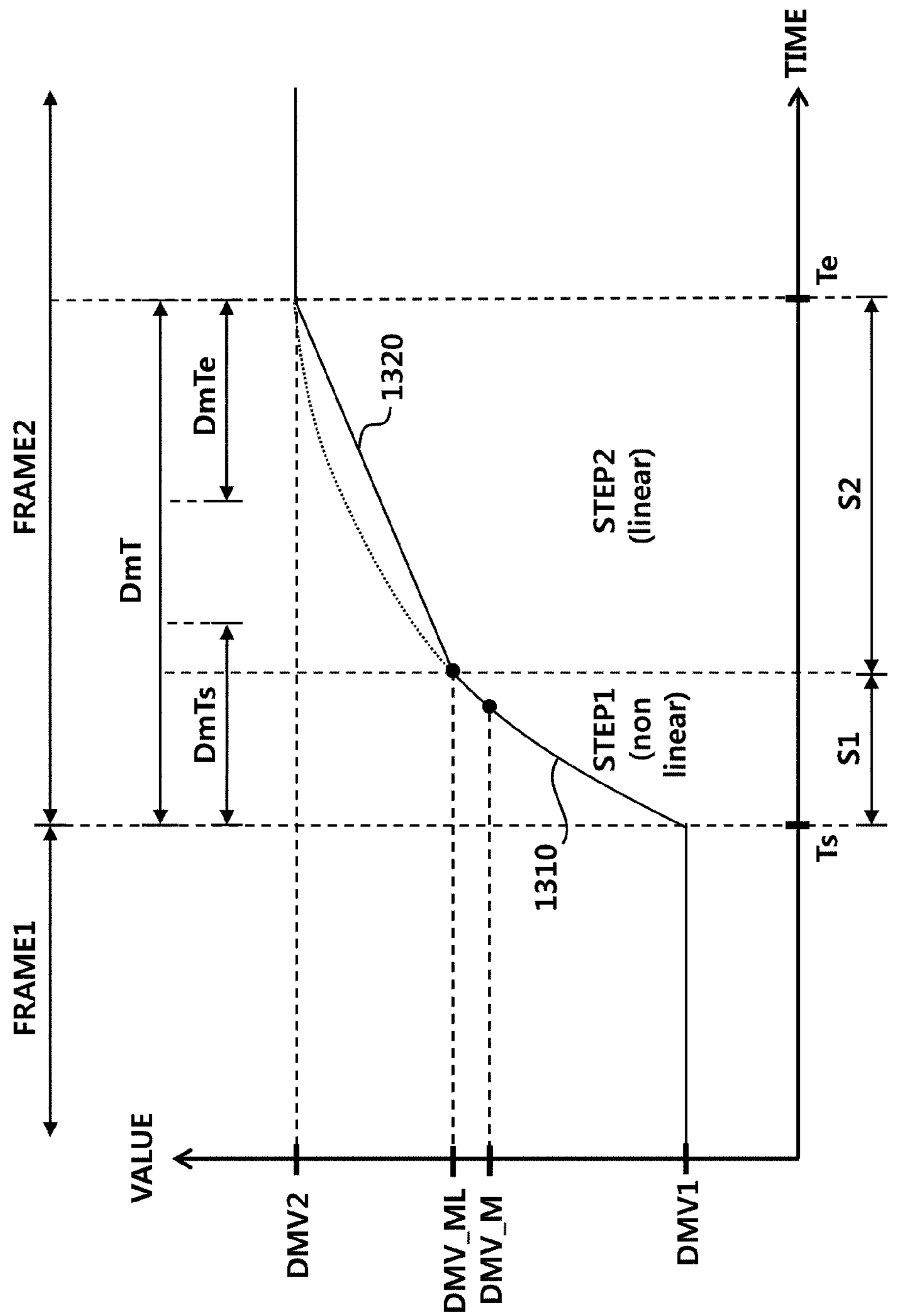
FIG. 13 is a diagram illustrating a third example for explaining a change in a dimming value between frames according to another embodiment.

FIG. 13 is a diagram illustrating a third example for explaining a change in a dimming value between frames according to another embodiment.

Referring to FIG. 13, a dimming value adjusting circuit of a dimming processing device according to another embodiment may adjust the time of changing from one function to another function while modeling changing of a dimming value using a plurality of functions.

In general, the predetermined dimming value may be an intermediate dimming value DMV_M (see FIG. 11). However, the present disclosure is not limited thereto, and the predetermined dimming value may be greater than the intermediate dimming value DMV_M.

For example, the dimming value adjusting circuit may change the dimming value from a first dimming value DMV1 at a start time Ts to a dimming value DMV_ML, which is greater than the intermediate dimming value DMV_M, during a first interval S1. In FIG. 13, as a first step, the dimming value may change the dimming value from a first dimming value DMV1 to a dimming value DMV_ML, which is greater than the intermediate dimming value DMV_M, according to a first function 1310, which is a nonlinear function, during the first interval S1 {STEP1 (nonlinear) in FIG. 13}. The first step STEP1 or the first interval S1 may correspond to a section in which the dimming value changes from the first dimming value DMV1 to the dimming value DMV_ML greater than the intermediate dimming value DMV_M.

In the second step STEP2 or the second interval S2, the dimming value may change from a dimming value DMV_ML, which is greater than the intermediate dimming value DMV_M, to a second dimming value DMV2. The dimming value adjusting circuit of the dimming processing device may change the dimming value according to a second function 1320. In FIG. 13, as a second step, the dimming value may change from the dimming value DMV_ML, which is greater than the intermediate dimming value DMV_M, to the second dimming value DMV2, which is a target dimming value, according to the second function 1320, which is a linear function, during the second interval S2 {STEP2 (linear) in FIG. 13}. The second step STEP2 or the second interval S2 may correspond to a section in which the dimming value changes from the dimming value DMV_ML, which is greater than the intermediate dimming value DMV_M, to the second dimming value DMV2.

What is claimed is:

1. A display device comprising:
a backlight; and
a dimming processing device for controlling the backlight,
wherein the dimming processing device comprises:
a dimming value receiving circuit configured to receive a first dimming value and a second dimming value, wherein the first and second dimming values are for adjusting the backlight, and wherein a frame includes a first time interval, a second time interval subsequent to the first time interval, and a third time interval subsequent to the second time interval; and
a dimming value adjusting circuit configured to:
adjust the first dimming value to a predetermined dimming value at a first rate during the first time interval,
adjust the predetermined dimming value to the second dimming value at a second rate different from the first rate during the second time interval, and
maintain the second dimming value during the third time interval,
wherein the predetermined dimming value is a value between the first dimming value and the second dimming value.

2. The display device of claim 1, wherein the dimming value adjusting circuit is configured to adjust the dimming value from the first dimming value to the second dimming value when a frame changes in frames.

3. The display device of claim 1, wherein:
the first dimming value is adjusted to the predetermined dimming value during the first time interval using a first function,
the predetermined dimming value is changed to the second dimming value during the second time interval using a second function, and
the first and second functions have different characteristics.

4. The display device of claim 3, wherein the first time interval is identical to the second time interval.

5. The display device of claim 3, wherein the first time interval has an interval different from that of the second time interval.

6. The display device of claim 3, wherein the second time interval is determined by based on the first time interval.

7. The display device of claim 3, wherein:
the first and second time intervals are determined by based on the predetermined dimming value; or
the predetermined value is determined by based on the first and second time intervals.

8. The display device of claim 3, wherein the first time interval comprises at least a portion of an initial interval of a dimming change time and the second time interval comprises at least a portion of a latter interval of the dimming change time.

9. A display device comprising:
a backlight; and
a dimming processing device for controlling the backlight,
wherein the dimming processing device comprises:
a dimming value receiving circuit configured to receive a target dimming value; and
a dimming value adjusting circuit configured to adjust the dimming value according to the target dimming value during a dimming adjustment time interval in frames, wherein:
when a frame changes, the dimming value adjusting circuit is configured to:
(i) increase the dimming value to a predetermined dimming value at a first rate of change during a first time interval of a first frame,
(ii) increase the predetermined dimming value to the target dimming value at a second rate of change during a second time interval of the first frame, and
(iii) maintain the target dimming value during a third time interval of the first frame,
the second time interval follows the first time interval,
the third time interval follows the second time interval, and
the first rate and the second rate are different from each other,
wherein the predetermined dimming value is a value between the first dimming value and the second dimming value.

10. The display device of claim 9, wherein the first time interval is identical to the second time interval.

11. The display device of claim 9, wherein the first time interval has an interval different from that of the second time interval.

12. The display device of claim 9, wherein the second time interval is determined by based on the first time interval.

13. The display device of claim 9, wherein:
the first and second time intervals are determined by based on the predetermined dimming value; or
the predetermined value is determined by based on the first and second time intervals.

14. A display device comprising:
a backlight; and
a timing controller configured to output a dimming control signal for the backlight,
wherein the timing controller comprises:
a dimming value adjusting circuit configured to:
(i) change a dimming value of the backlight from a first dimming value to a predetermined dimming value according to a first rate of change in the dimming value during a first time interval within a frame,
(ii) change the dimming value from the predetermined dimming value to a second dimming value according to a second rate of change in the dimming value during a second time interval within the frame, and
(iii) maintain the second dimming value during a third time interval within the frame,
wherein:
the second time interval follows the first time interval,
the third time interval follows the second time interval, and the first rate and the second rate are different from each other, wherein the predetermined dimming value is a value between the first dimming value and the second dimming value.

15. The display device of claim 14, wherein the first time interval is identical to the second time interval.

16. The display device of claim 14, wherein the first time interval has an interval different from that of the second time interval.

17. The display device of claim 14, wherein the second time interval is determined by based on the first time interval.

18. The display device of claim 14, wherein:

the first and second time intervals are determined by based on the predetermined dimming value; or the predetermined value is determined by based on the first and second time intervals.

19. The display device of claim 14, wherein the first dimming value and the second dimming value are generated according to a control signal received from a host.

20. The display device of claim 14, wherein the display device comprises a dimming output circuit, and the dimming output circuit is configured to transmit the dimming control signal to a backlight driving device for adjusting the brightness of the backlight.

* * * * *